April 16, 1929.    R. O. CATLAND    1,709,606
METHOD OF FORMING CUTTERS
Filed April 6, 1928
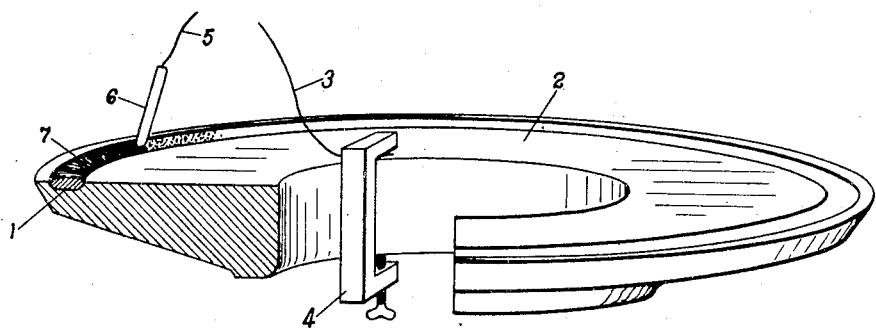
R. O. CATLAND    INVENTOR
BY    Jesse R. Stone
ATTORNEY Patented Apr. 16, 1929.

1,709,606

UNITED STATES PATENT OFFICE.

RAYMOND O. CATLAND, OF LOS ANGELES, CALIFORNIA.

METHOD OF FORMING CUTTERS.

Application filed April 6, 1928. Serial No. 267,988.

My invention relates to cutters such as are employed in well drilling, and the like, and pertains particularly to the method of forming a hardened cutting edge thereon.

In the manufacture of cutters of the character referred to it is old to weld, or otherwise secure, to the cutting edge thereof a hard metal adapted to withstand abrasion and wear. Chromium, tungsten and various trade compounds such as "stellite," "studite," or "borium" are employed for this purpose.

Borium which is a particularly desirable compound is a carbide of tungsten, and is usually obtained in metallic form and is welded in place at high temperatures. The borium is reduced to metallic slugs or chips and in that shape is brought to the job and welded in position. Other metals are similarly employed. The hardened material thus used is embedded in the welding material and comprises small particles which may be chipped or broken from the blade upon which they are fixed.

It is an object of my invention to fuse the hard metal to the blade in a black amorphous condition so that it will be more smoothly and uniformly applied and to also economize in the time consumed in placing the metal in working position upon the blade.

In the drawing I have shown a disc-shaped cutter such as is employed on well drills, illustrating the application thereof of my invention.

In carrying out my invention a cutter to receive the hard material is best formed with a groove, such as is shown at 1 in the figure, closely adjacent the cutting edge of the cutter 2. In this groove I place my chromium, tungsten or other metal which is to be used, said metal being in the black amorphous state. Such other material as carbon, or similar elements, are mixed with the amorphous metal and then the material is fused in position by a welding torch or an electric arc. In the drawing, one of the terminals 3 of an electric circuit is connected with the body of the cutter by means of a clamp 4, so that the cutter itself becomes one of the electrodes. The other terminal 5 has thereon an electrode 6 of any desired material. Sufficient current is employed to secure the proper fusing temperature and the material is thus welded in position within the groove as shown at 7 in the drawing.

When thus welded in position, the material forms a more homogeneous mass having uniform hardness which will resist abrasion and wear and will be particularly adapted to resist chipping as is the case where the old methods are used.

Not only are better results obtained in wearing qualities, but there is a saving in time and expense in welding the material to the blade in this way. The step of first fusing the hard material into slugs or chips is eliminated and the process of securing the material upon the blade is simplified.

Having thus described my invention, what I claim as new is:

1. A method of producing a hard edge on cutters comprising forming a facing area along the edge of the cutter to receive a hard material, placing said material in a finely divided condition upon said area, and submitting said material to high temperature and thus welding said material upon said area.

2. A method of producing a hard cutting face on a cutter, comprising placing a hard material such as tungsten in a finely divided condition in the desired position on said cutter and welding the material to said cutter.

3. A method of producing a hard cutting edge on a cutter, comprising placing a hard material in powdered form within a groove in said cutter and fusing said material within said groove.

In testimony whereof I hereunto affix my signature this 14 day of March, A. D. 1928.

RAYMOND O. CATLAND.